United States Patent
Chang et al.

[11] Patent Number: 6,119,331
[45] Date of Patent: Sep. 19, 2000

[54] NOTCHING THE FIRST POLE PIECE OF A WRITE HEAD WITH A NOTCHING LAYER IN A COMBINED MAGNETIC HEAD

[75] Inventors: Thomas Young Chang; Edward Hinpong Lee; Jhy-Shuey Jerry Lo, all of San Jose, Calif.

[73] Assignee: International Business Machines Corporation, Armonk, N.Y.

[21] Appl. No.: 08/889,258

[22] Filed: Jul. 8, 1997

[51] Int. Cl.⁷ .................................................. G11B 5/127
[52] U.S. Cl. ................................... 29/603.14; 29/603.16; 216/22
[58] Field of Search .................................. 29/603.13, 14, 29/15, 18; 360/113; 216/22

[56] References Cited

U.S. PATENT DOCUMENTS

| 5,285,340 | 2/1994 | Ju et al. | 360/119 |
| 5,438,747 | 8/1995 | Krounbi et al. | 29/603 |
| 5,452,164 | 9/1995 | Cole et al. | 360/113 |

*Primary Examiner*—Carl E. Hall
*Assistant Examiner*—Davide Caputo
*Attorney, Agent, or Firm*—Gray Cary Ware & Freidenrich LLP; Ervin F. Johnston

[57] ABSTRACT

In the manufacture of a combined magnetic head, milling time for notching a first pole piece of the head's write element is reduced by constructing the first pole piece with a notching layer on a first pole piece layer, the notching layer having first and second corners adjacent first and second side walls of the second pole tip. The first pole piece layer has a wide lateral expanse, and the notching layer has a narrow lateral expanse. The width of the notching layer is preferably 0.2 $\mu$m to 2.0 $\mu$m wider than a target track width of the second pole tip. With this arrangement, the notching layer has first and second side walls that project 0.10 $\mu$m to 1.0 $\mu$m, laterally, beyond first and second side walls, respectively, of the second pole tip. The thickness of the notching layer is preferably between 0.1 $\mu$m to 1.0 $\mu$m. Accordingly, full notching of the notching layer can be achieved by milling a small corner in a range of 0.10 $\mu$m by 0.10 $\mu$m to 1.0 $\mu$m by 1.0 $\mu$m, as seen in an ABS view. The gap layer is formed on the notching layer, followed by forming the second pole tip on the gap layer. Milling at an angle is then employed to mill through the gap layer and notch the notching layer. In comparison to milling a prior art large lateral expanse of the first pole piece to achieve notching, milling the small corner of the notching layer requires a very short milling time. This results in less consumption of the second pole tip, so that better control of a final track width can be accomplished. Also, since there is less consumption of the top of the second pole tip, the aspect ratio of photoresist employed to construct the second pole tip is reduced, so as to enhance the line width of the second pole tip. Further, there is less redeposited material to clean up after the milling cycle. All of these factors reduce the process time and increase manufacturing throughput.

50 Claims, 9 Drawing Sheets

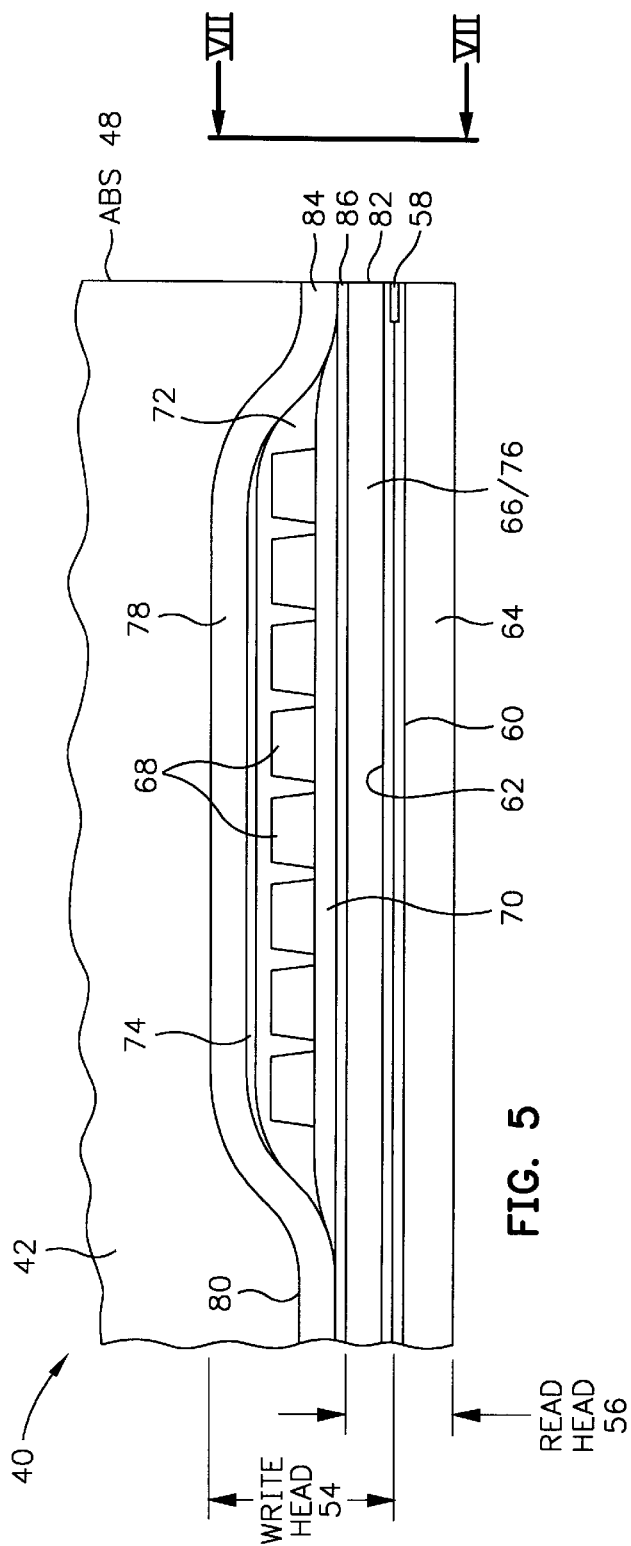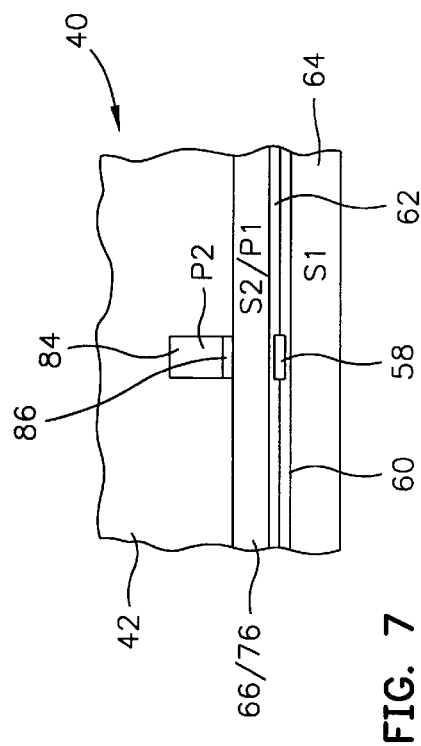
FIG. 5
FIG. 7

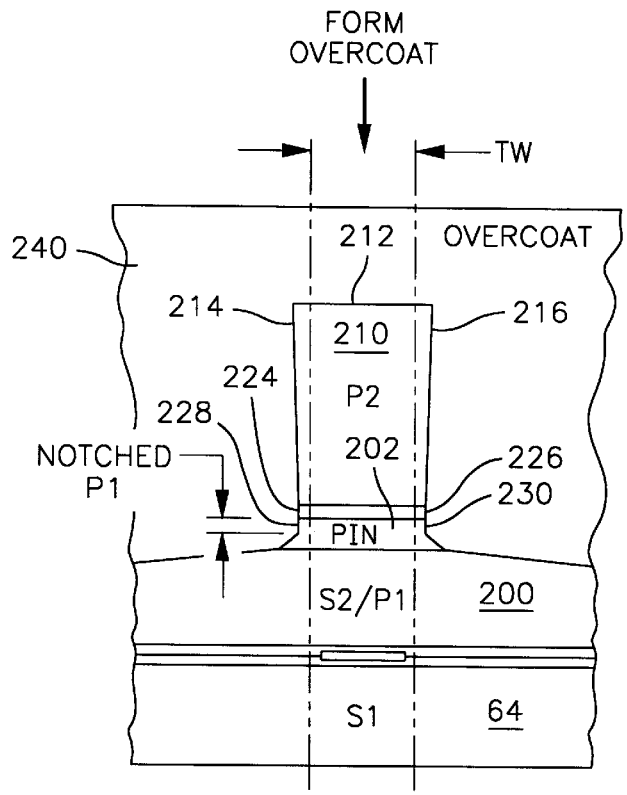
FIG. 20
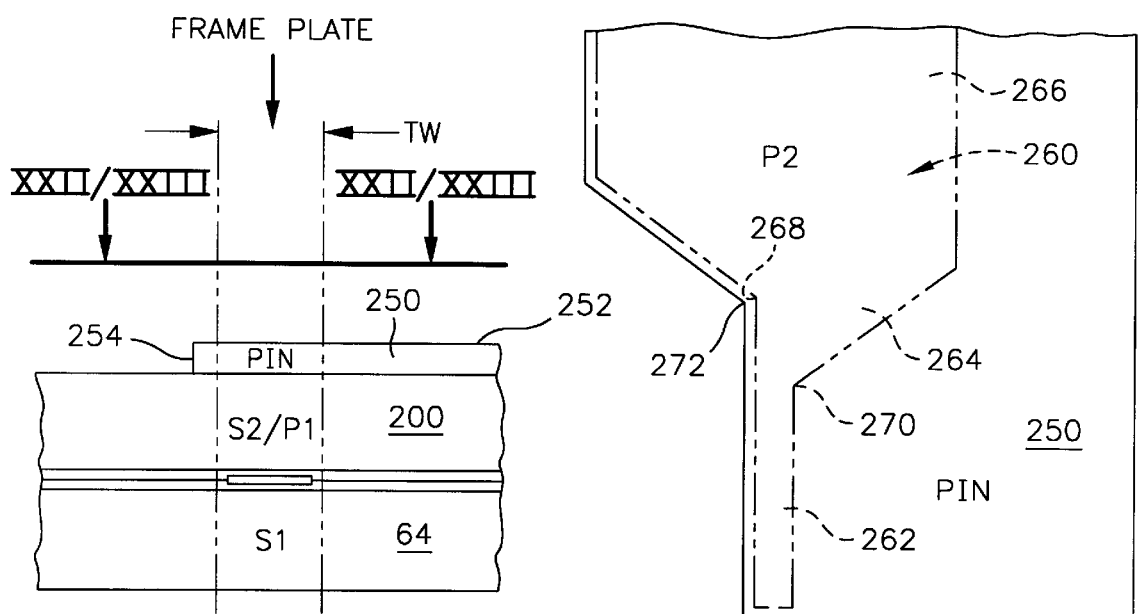
FIG. 21
FIG. 22

NOTCHING THE FIRST POLE PIECE OF A WRITE HEAD WITH A NOTCHING LAYER IN A COMBINED MAGNETIC HEAD

CROSS REFERENCE TO RELATED PATENTS

Cross reference is made to commonly assigned U.S. Pat. No. 5,438,747 and commonly assigned U.S. Pat. No. 5,452,164 which are incorporated by reference herein.

BACKGROUND OF THE INVENTION

1. Field of the Invention

The present invention relates to a merged MR head made by notching the first pole piece of the head's write element and also to forming a notched first pole piece with a first pole piece layer and a notching layer and then milling a gap layer and the notching layer, employing a second pole tip as a mask, until side walls of the second pole tip, the gap layer and the notching layer are contiguous.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.05 $\mu$m.

The second pole, along with its second pole tip, is frame-plated on top of the gap layer. After depositing a seed layer on the gap layer, a photoresist layer is spun on the seed layer, imaged with light, and developed to provide an opening surrounded by a resist wall for plating the second pole piece and second pole tip. To produce a second pole tip with a narrow track width, the photoresist layer has to be correspondingly thin. This relationship, referred to as the "aspect ratio", is the ratio of the thickness of the photoresist in the pole tip region to the track width of the second pole tip. Preferably, the aspect ratio should be on the order of three. In other words, for a track width of 1 $\mu$m, the thickness of the photoresist in the pole tip region should be about 3 $\mu$m. If the photoresist is thicker than this, the side walls of the second pole tip, especially at the base, will not be well-formed due to scattering of light as it penetrates the photoresist during the imaging step.

Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced. When the first pole piece is notched, it has first and second side walls that are aligned with first and second side walls of the second pole tip, so that the first pole piece and the second pole tip have the same track width at the ABS. This minimizes fringing of magnetic fields from the second pole tip laterally beyond the track width (side writing) to a wide expanse of the first pole piece.

A prior art process for notching the first pole piece entails ion beam milling the gap layer and the first pole piece, employing the second pole tip as a mask. According to this prior art process (typified in U.S. Pat. No. 5,452,164 and U.S. Pat. No. 5,438,747), the gap layer is typically alumina, and the first and second pole pieces and pole tips are typically Permalloy (NiFe). Alumina mills more slowly than Permalloy; thus the top of second pole tip and a top surface of the first pole piece are milled more quickly than the gap layer. Further, during ion milling, there is significant redeposition of alumina on surfaces of the workpiece. The milling ion beam is typically directed at an angle with respect to a normal to the layers, in order that milling and clean-up be done simultaneously.

Notching the first pole piece is very time consuming due, in part, to shadowing of the notch sites by the angled milling and by the profile of the second pole tip, as the wafer supporting the magnetic head is rotated. The length of milling time is due more, however, to the large lateral expanse of the first pole piece. Since the top and side walls of the second pole tip are also milled while the first pole piece is being notched, the second pole tip has to be formed with extra thickness and width so that, after notching is completed, the second pole tip is at its target height and target track width. Unfortunately, because of the long time required for notching it is difficult to meet the targets within acceptable tolerances. This has lowered manufacturing yield. Also, the extra height of the initially formed second pole tip increases the aspect ratio and reduces the line width of the second pole tip.

In order to minimize overmilling of the first pole piece, another process removes the gap layer, except for a desired portion between the first and second pole tips, by a wet etchant. After the unwanted portions of the gap layer are removed, the first pole piece is ion milled, employing the second pole tip as a mask. This process eliminates significant redeposition of the alumina. A problem with this process, however, is that the etching undercuts the gap layer under the base of the second pole tip, which is a critical area for the transfer of field signals. The undercut regions provide spaces where Permalloy can be redeposited during subsequent ion milling of the first pole piece, or other foreign material can be redeposited upon subsequent milling and clean-up steps. Further, if the track width of the second pole tip is in the order of 1 µm, the etchant may release the second pole tip from the gap layer, thus ruining the head.

SUMMARY OF THE INVENTION

We have discovered that construction of a notching layer on a typical first pole piece layer with first and second corners adjacent the first and second side walls of the second pole tip will reduce the milling time required for notching. We construct the first pole piece layer with a wide lateral expanse, and the notching layer on the first pole piece layer with a narrow lateral expanse. We prefer the width of the notching layer to be 0.5 µm to 2.0 µm wider than the target track width of the second pole tip. With this arrangement, the notching layer has first and second side walls which project 0.25 to 1.0 µm laterally beyond the first and second side walls, respectively, of the second pole tip. The thickness of the notching layer is, preferably, between 0.2 µm to 1.0 µm. Accordingly, full notching of the notching layer can be achieved by milling a small corner in a range of 0.25 µm by 0.2 µm to 1.0 µby 1.0 µm, as seen in an ABS view. The gap layer is formed on the notching layer, followed by formation of the second pole tip on the gap layer. Milling at an angle is then employed to penetrate the gap layer and notch the notching layer. In comparison to the prior art where a large lateral expanse of the first pole piece is milled to achieve notching, milling the small corner of the notching layer requires a very short milling time. This results in less consumption of the second pole tip, so that better control of a final track width can be accomplished. Also, since there is less consumption of the top of the second pole tip, the aspect ratio of the photoresist employed to construct the second pole tip is lessened so as to enhance the line width of the second pole tip. Further, there is less redeposited material to clean up after the milling cycle. All of these factors reduce the process time and increase manufacturing throughput.

Another advantage of the present invention is that the milling that removes a second pole tip seed layer can be continued to perform notching. This still further lessens the process time by obviating any necessity of making a separate set up. Still another advantage is that the first pole piece layer and the notching layer of the first pole piece can be constructed of different materials, with different magnetic moments. Still a further advantage of the present invention is that the first pole piece can be notched on only one side, which provides the same benefits for servoing that are afforded by a double-notched first pole piece. A single-notched first pole piece can be formed by employing the above method, with the exception that the notching layer is given a wide expanse on the side that is not to be notched. Since the corner on the opposite side is quickly milled, there is very little notching of the wide expanse. It should be noted that single-side notching will also result in less redeposition of milled material.

Process time can still further be reduced with the single-side notching embodiment by forming the second pole piece with an asymmetrical flare and a matching notching layer. The second pole piece flares out laterally in first and second directions, from a recessed end of the second pole tip, to a recessed yoke portion of the second pole piece. The commencement of the flare is referred to as the flare point. We have discovered that by keeping a normal flare point on the side of the wide expanse, where the notching layer is not to be notched, and a flare point recessed from the normal flare point, on the side of the narrow expanse where the notching layer is to be notched, there is less shadowing of the notch site during the milling cycle. The notching layer is configured similarly to the second pole piece, with an asymmetrical flare portion and a border extension from the second pole piece. With this arrangement the second pole piece and the notching layer are further back on the side where notching is to take place, lengthening the time that the angled milling beam strikes the notching site during rotation of the wafer supporting the partially completed magnetic head.

An object of the present invention is to provide a method of notching a first pole piece with less processing time.

Another object is to provide a method of notching a first pole piece with more control of the target track width of the second pole tip.

A further object is to provide a method of notching a first pole piece with less consumption of the second pole tip and less redeposition to cleanup after notching the first pole piece.

Still another object is to provide a method wherein single side notching can be performed.

Still a further object is to provide a first pole piece of a magnetic head with a notching layer which is only partially notched.

Yet another object is to provide a first pole piece of a magnetic head that has different materials with different magnetic moments.

Other objects and attendant advantages of the invention will be appreciated upon reading the following description taken together with the drawings.

BRIEF DESCRIPTION OF THE DRAWINGS

FIG. 5 is a partial elevation view of the slider and magnetic head as seen in plane V—V of FIG. 2;

FIG. 7 is a partial ABS view of the slider taken along plane VII—VII of FIG. 5 to show the read and write elements of the magnetic head;

FIG. 20 is similar to FIG. 17 except an overcoat layer has been formed;

FIG. 21 is the first step of another embodiment of the present invention wherein a notching layer (PIN) is formed;

FIG. 22 is a view taken along plane XXII—XXII of FIG. 21 showing a first aspect of the second embodiment shown in FIG. 21, with the second pole piece shown in phantom;

DESCRIPTION OF THE PREFERRED EMBODIMENT

Figure 1:
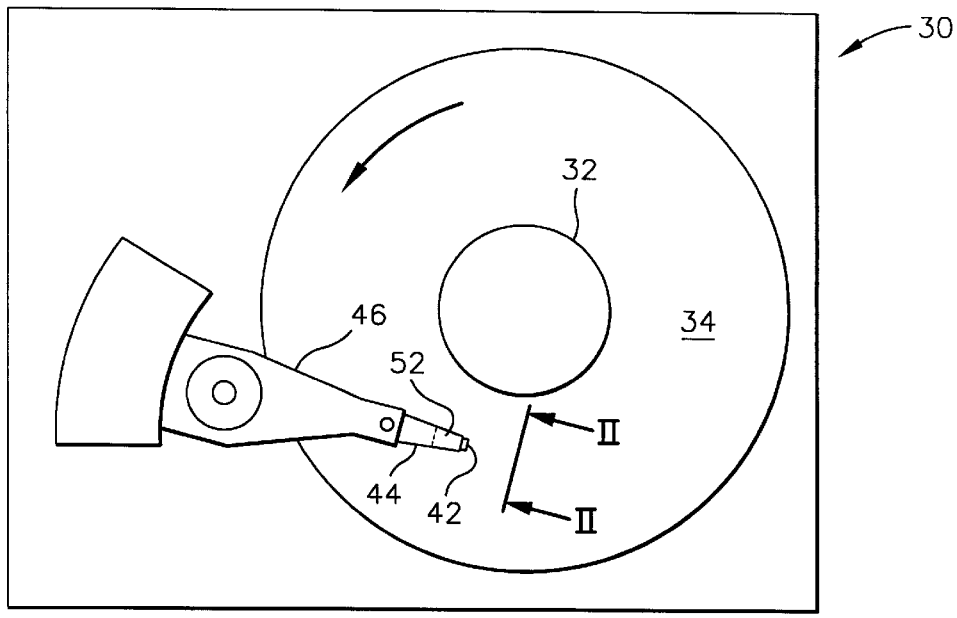
FIG. 1 is a planar view of an exemplary magnetic disk drive.
Figure 2:
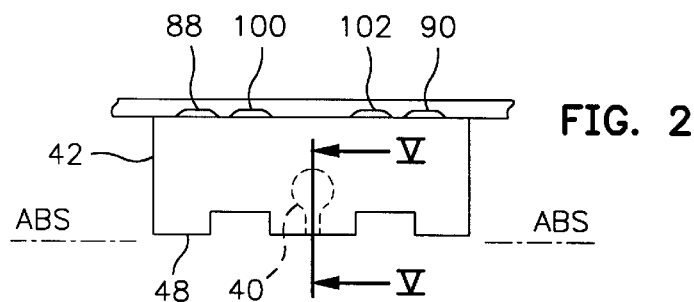
FIG. 2 is an end view of a slider with a magnetic head of the disk drive as seen in plane II—II.
Figure 3:
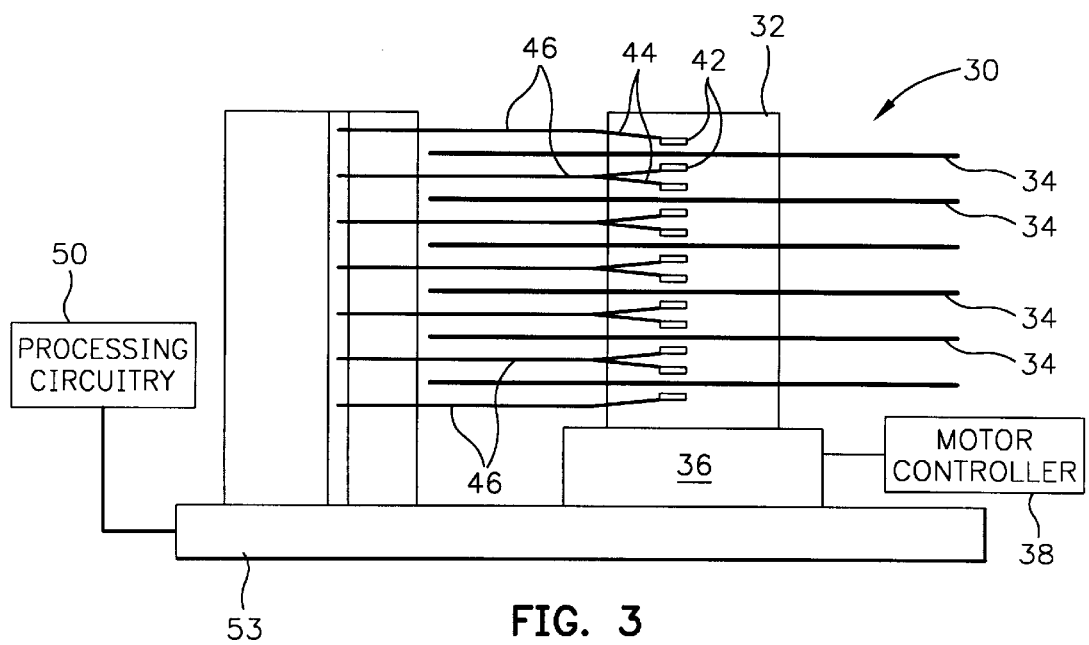
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 μm) cushion of air (air bearing) between the disk and an air bearing surface (ABS) 48.

Figure 4:
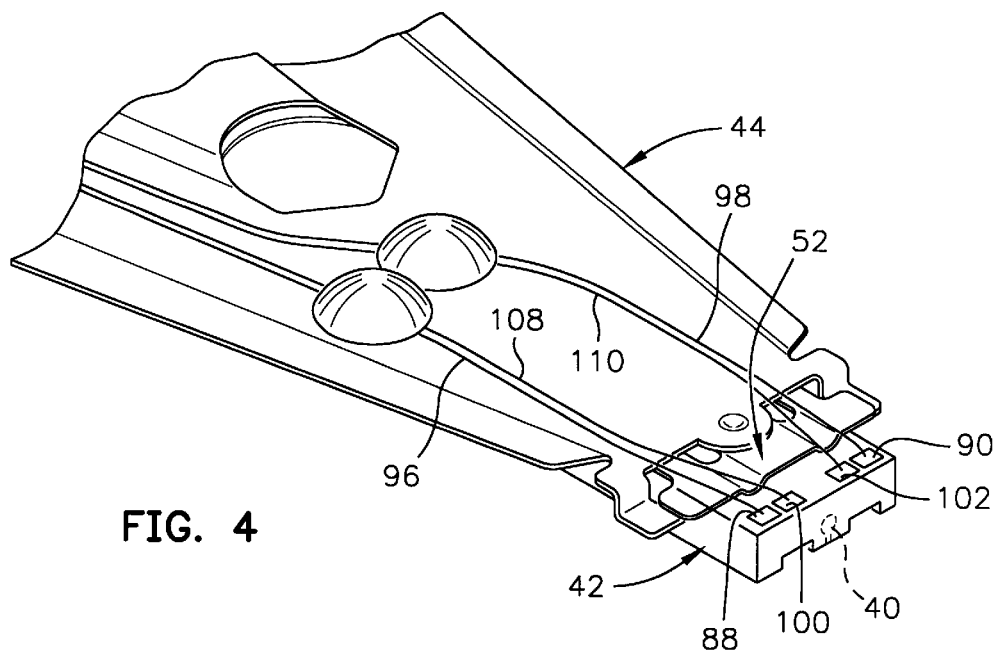
FIG. 4 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 that is mounted to the suspension 44. All of the above components are supported on a base 53.

FIG. 5 is a side cross-sectional elevation view of a merged magnetoresistive (MR) head 40, with a write head portion 54 and a read head portion 56. The read head portion includes an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes, which are processed by the processing circuitry 50 shown in FIG. 3.

Figure 6:
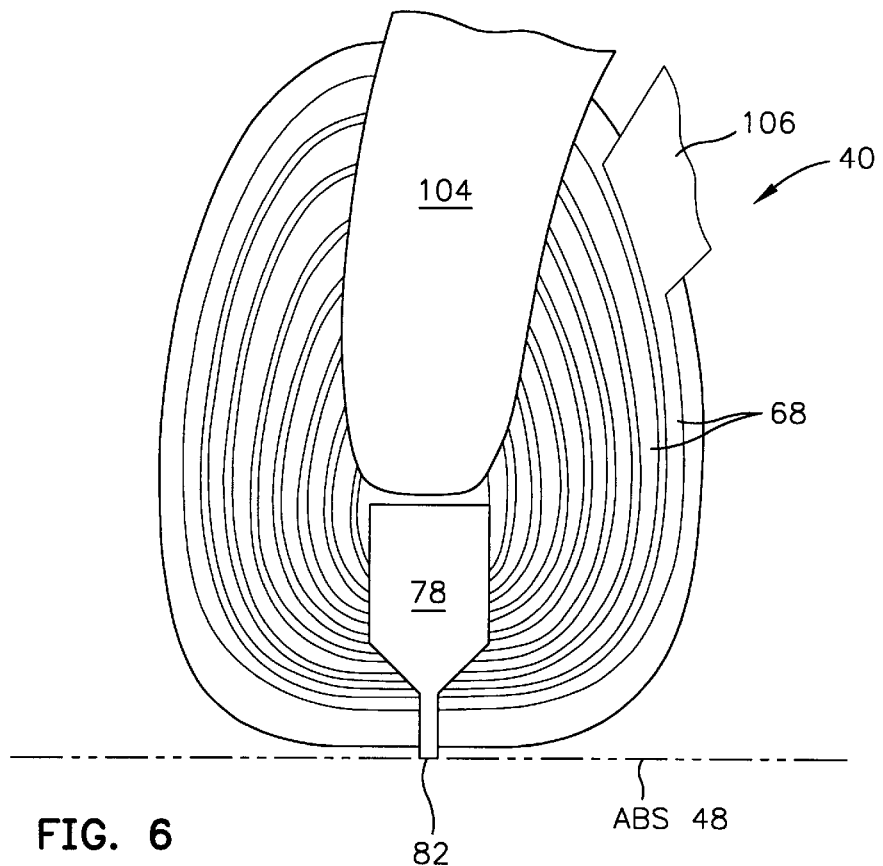
FIG. 6 is a top view of the second pole piece and coil layer, a portion of which is shown in FIG. 5, with all insulation material removed.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to as an "insulation stack". The coil layer 68, and the first, second and third insulation layers 70, 72 and 74, are sandwiched between first and second pole piece layers 76 and 78. The first and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from the MR sensor 58 to leads 96 and 98 on the suspension 44; third and fourth solder connections 100 and 102 connect leads 104 and 106 from the coil 68 (see FIG. 6) to leads 108 and 110 on the suspension.

Figure 8:
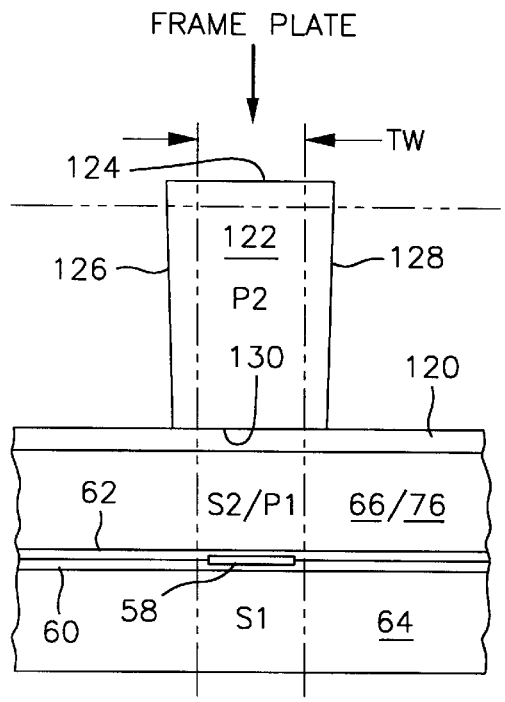
FIG. 8 is an ABS of a prior art head prior to notching the first pole piece.

FIG. 8 shows an ABS view of a prior art merged magnetic head, in which the second shield of the read head and the first pole piece of the write head are a common layer 66/76. The gap layer 120 has been formed on the first pole piece layer 66/76, followed by frame plating a second pole tip 122 on the gap layer 120. The second pole tip 122 is a front portion of the second pole piece. The second pole tip is bounded by a top 124, first and second side walls 126 and 128, and a base 130. The target track width (TW) is shown in FIG. 8. Since the first pole piece will be notched by ion milling, the second pole tip 122 is larger than a target size track width (TW) of the second pole tip, so as to allow for consumption of the second pole tip during a subsequent milling cycle. Accordingly, before milling, the first and second side walls 126 and 128 extend beyond the track width, and the top 124 is higher than the target height. The dimensions of these sacrificial portions is referred to in the art as windage.

Figure 9:
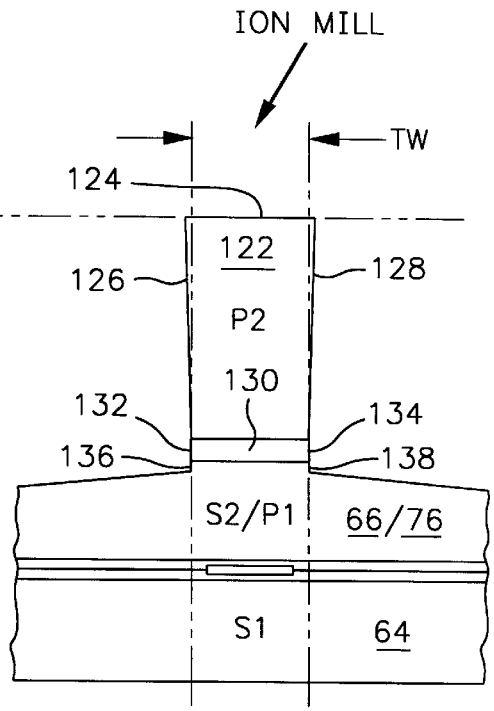
FIG. 9 is an ABS view of the prior art head after the first pole piece is formed with notches by milling.

In FIG. 9 ion milling is employed to mill through the gap layer to form a write gap 130 with first and second side walls 132 and 134, and to mill notches into the first pole piece 66/76 with first and second side walls 136 and 138. After milling, the first side walls 126, 132 and 136 are contiguous, and the second side walls 128, 134 and 138 are contiguous. This notching improves the transfer of flux between the second pole tip 122 and the first pole piece 66/76, since the flux will transfer to the pedestal portion of the first pole piece instead of the larger expanse thereof. This reduces side writing by the write head. The milling is at an angle to a normal to the layers 66/76 and 64 in order to minimize redeposition of the milled material. It should be understood that the partially completed magnetic head in FIG. 9 rests upon a substrate (not shown) that is rotated during the milling cycle. The second pole tip is employed as a mask for forming the write gap 130 and notching the first pole piece at 136 and 138. It can be seen that this causes shadowing at the notching sites 136 and 138 during approximately 180° of the rotation, due to the angle of the milling. This shadowing increases the processing time required to form the notches in the first pole piece. It should be noted that the downward sloping portions of the first pole piece layer 62 in FIG. 9 are formed due to the shadowing by the second pole tip 122.

After milling, the second pole tip 122 has been reduced in size. With the prior art method it is very difficult to reduce the second pole tip 122 to the target track width and the target height because of the significant time required for milling the large lateral expanse of the first pole tip 66/76. Milling of flat surfaces is very time-consuming as compared to side walls. Further, the top 124 in FIG. 8 requires extra height because of the long time required for milling. This extra height increases the aspect ratio (ratio between height of resist employed to frame plate the second pole tip 122 and the target track width), which reduces the line width of the second pole tip. Prior art methods of notching the first pole piece discussed in commonly assigned U.S. Pat. Nos. 5,438,747 and 5,452,164 indicate a strong-felt need to reduce the time required to notch the first pole piece of a write head. The invention advantageously reduces this notching time.

FIGS. 10–20 illustrate a first embodiment of the present invention, which significantly decreases the milling time required to notch the first pole piece. In the present invention, the first pole piece comprises two layers, namely a first pole piece layer 200, which may be identical to the layer 66/76 in FIG. 8, and a notching layer 202 on top of the first pole piece layer 200. The notching 202 is also referred to as a first pole piece notch (PIN). The notching layer 202 has a top 204, and first and second side walls 206 and 208. The side walls 206 and 208 extend beyond the target track width (TW) by an amount that is kept as small as possible in order to reduce the subsequent milling cycle. A preferred range for the extension of each side wall 206 and 208 beyond the target track width is 0.10 µm to 1 µm. The thickness of the notching layer may be 0.10 µm to 1 µm, depending upon the notching requirement. Accordingly, the corners of the notching layer to be moved during the notching cycle are the small portions shown outside of the target track width. The area of each corner, as seen in ABS view, would be in the range from 0.01 µm to 1.00 µm. It can be seen that the amount of milling time required to completely remove these corners is significantly less than that required to mill the large lateral expanses of the first pole piece layer 66/76 shown in FIG. 9.

Figure 10:
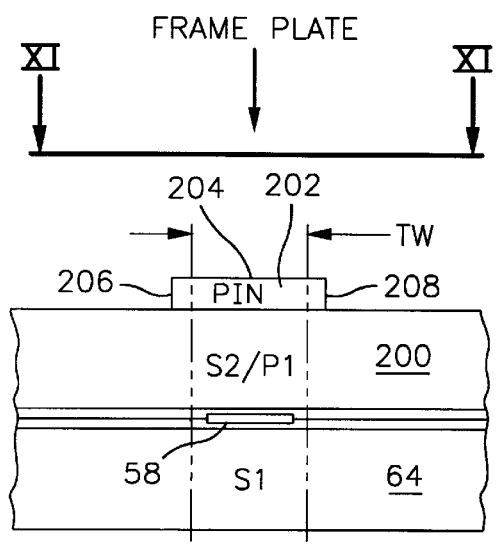
FIG. 10 is an ABS view of an initial step of the present invention where a notching layer (PIN) is formed for notching the first pole piece.
Figure 11:
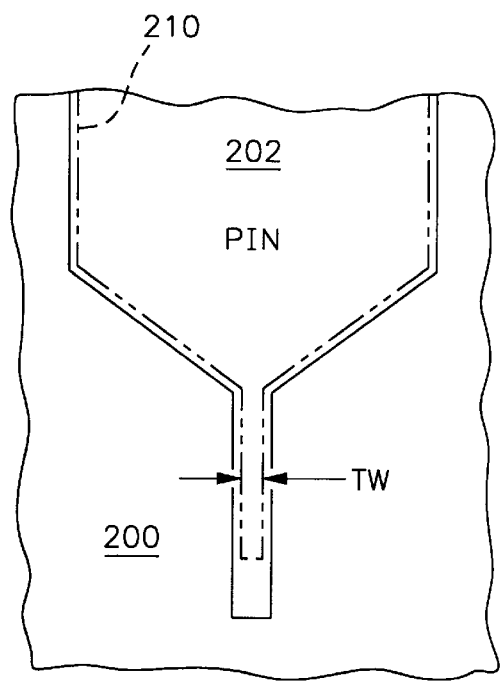
FIG. 11 is a view taken along plane XI—XI of FIG. 10.

The first step in the present invention is to frame plate the notching layer 204, as shown in FIG. 10. It should be noted that the MR sensor 58 is centered between the target track width, and has a track width slightly less than the track width of the write head, so as to satisfy the requirement of "write wide and read narrow". FIG. 11 shows a plan view of the notching layer 202; the second pole piece is shown in phantom at 210, since it hasn't yet been formed.

Figure 12:
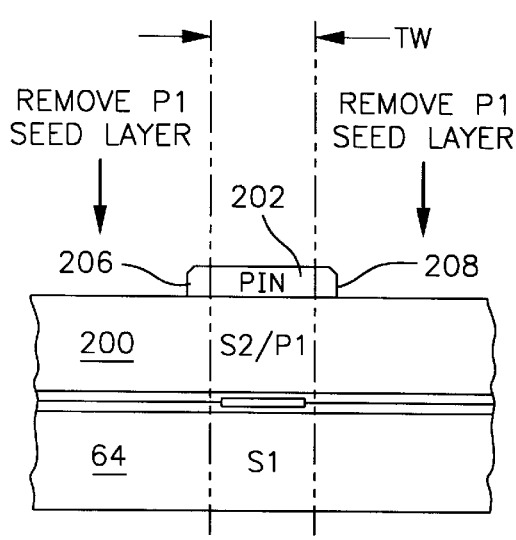
FIG. 12 is an ABS view of the next step in the present invention where a P1 seed layer is removed.
Figure 13:
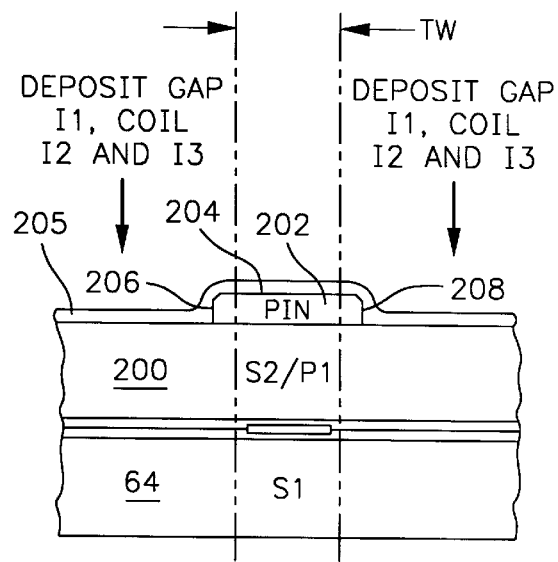
FIG. 13 is an ABS view of the present invention after forming a gap layer at the ABS.

In FIG. 12 a seed layer (not shown), employed for constructing the first pole piece layer 200, is removed by any suitable means such as ion milling. This ion milling slightly rounds the top corners of the notching layer 202, as shown in FIG. 12. The next step is to deposit a full film gap layer 205, as shown in FIG. 13. The thickness of the gap layer may be on the order of 0.2 µm. This covers the top 204 and the first and second side walls 206 and 208 of the notching layer, as well as the top of the first pole piece layer 200 in the field. The seed layer can be removed by either R.F. sputter etching or ion milling.

Figure 14:
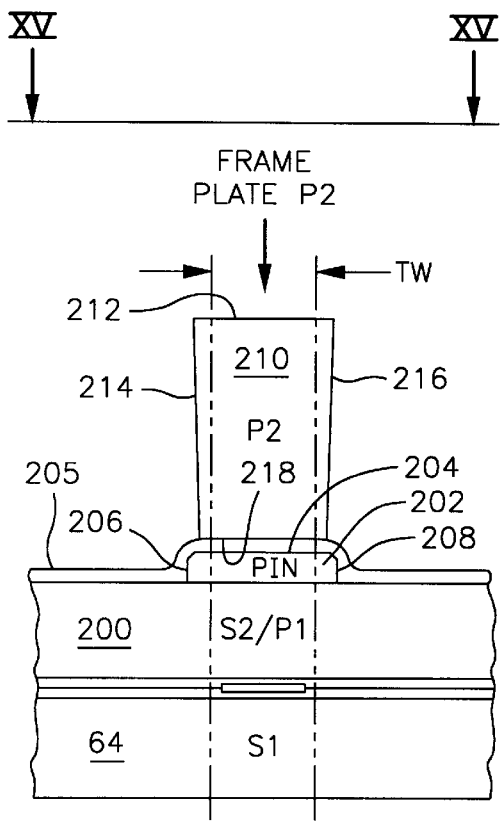
FIG. 14 is an ABS view of the method wherein the second pole piece, including a second pole tip, is frame plated on the gap layer.
Figure 15:
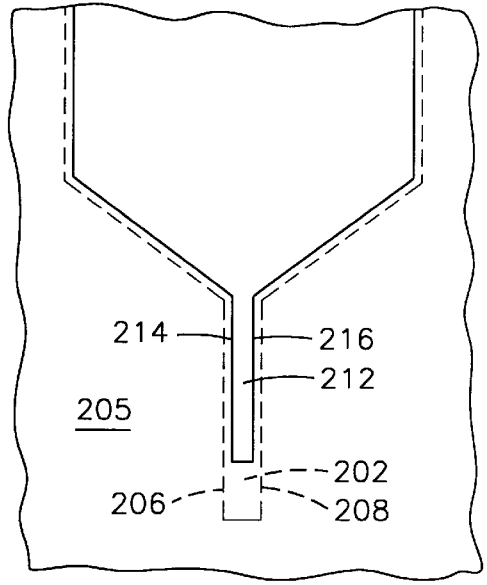
FIG. 15 is a view taken along plane XV—XV of FIG. 14.
Figure 16:
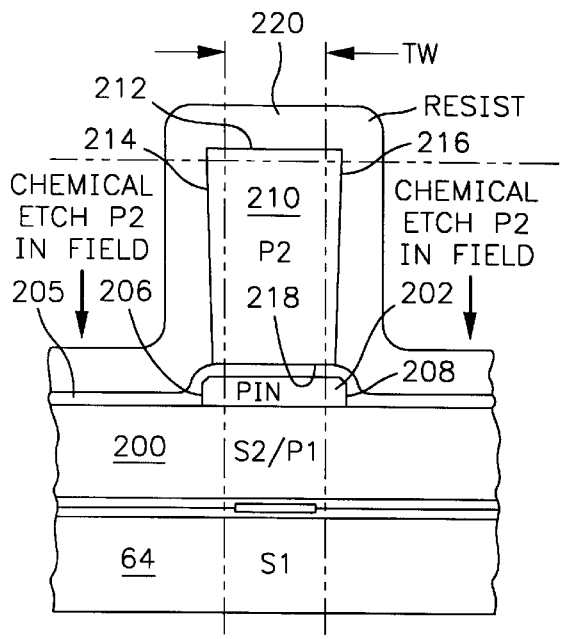
FIG. 16 is an ABS view of a step of chemically etching unwanted second pole piece material in the field.

The next step is to frame plate the second pole piece, which includes a second pole tip 210, on top of the gap layer 205 above the notching layer 202. The second pole tip 210 is formed with extra thickness and extra width, as shown in FIG. 14, to allow for windage, namely consumption of the second pole tip by processing steps. An extra thickness of 0.5 µm to 1.0 µm has been found to be satisfactory to allow for windage. The second pole tip 210 in FIG. 14 is bounded by a top 212, first and second side walls 214 and 216, and a base 218. The side walls 214 and 216 are milled by the subsequent milling step until they align with the target track width (TW). As shown in FIG. 16, the top of the second pole tip is covered with a resist layer 220 and field regions of the second pole piece are removed by chemical etching.

Figure 17:
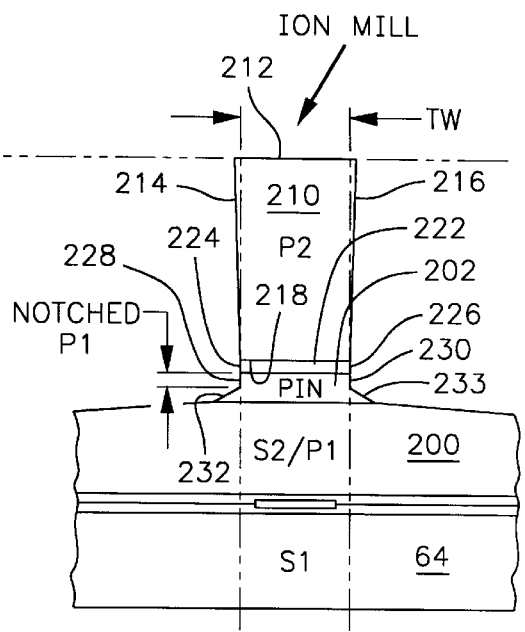
FIG. 17 is an ABS view of the present invention showing the notching layer being partially notched by ion milling.

In FIG. 17 the resist layer 220 has been removed, and ion milling is used to notch the notching layer 202. Ion milling is done at an angle to a normal to the top surfaces of the layers 64 and 200. A preferable range for this angle is 10° to 55° so as to ensure good milling and cleanup of any redeposited material. The milling first mills through the gap layer 205 of FIG. 16 to form a write gap layer 222, with first and second side walls 224 and 226. FIG. 17 shows one embodiment of the present invention wherein the notching layer 202 is partially notched with first and second side walls 228 and 230. In this embodiment, the notching layer 202 has third and fourth side walls 232 and 233, which are located laterally outwardly from the first and second side walls 228 and 230, respectively. A very short milling cycle is required to mill the notches at 228 and 230, compared to milling the large lateral expanse of the first pole piece layer 200. One of the advantages of the present invention is that the ion milling cycle shown in FIG. 17 is preferably a continuation of an ion milling cycle to remove a second pole tip seed layer employed to construct the second pole piece and second pole tip 210. Accordingly, the milling in FIG. 17 does not require a separate setup from the normal processing of the write head. Since less processing time is required to mill the notches at 228 and 230, the track width of the second pole tip 210, as defined by the side walls 214 and 216, at the base 218 can more nearly match the target track width (TW) than that obtained by the prior art.

Figure 18:
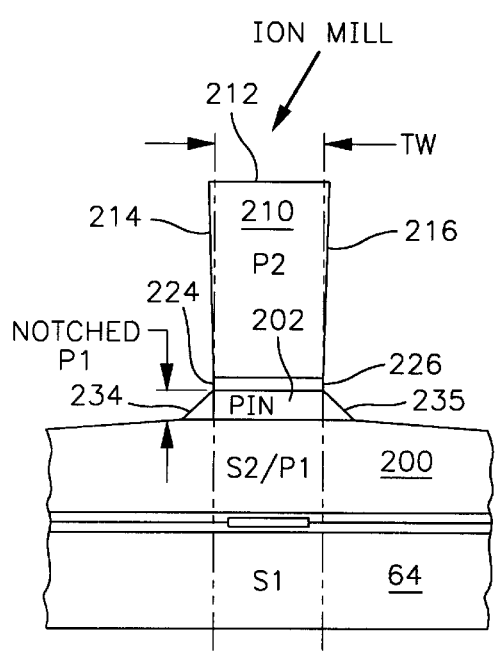
FIG. 18 is an ABS view showing the notching layer fully notched by ion milling.
Figure 19:
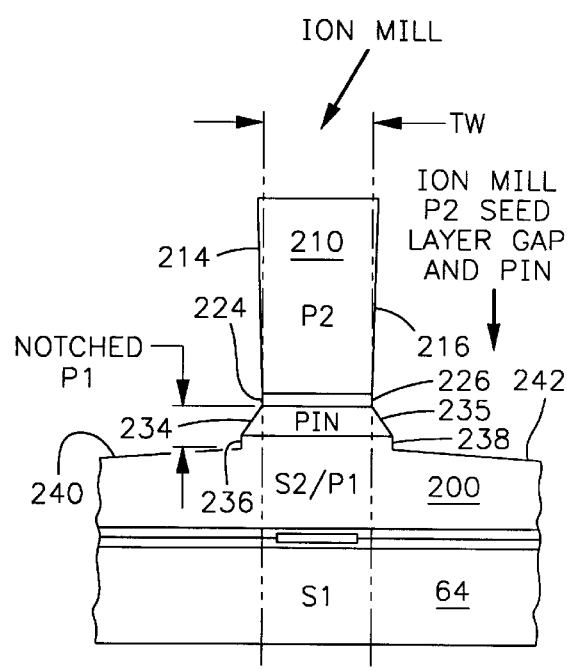
FIG. 19 is an ABS view similar to FIG. 18 except the first pole piece layer is also partially notched.

FIG. 18 is a second embodiment of the invention wherein the ion milling is employed to simply make first and second side walls 234 and 235 of the notching layer contiguous with the first and second side walls 224 and 226 of the gap layer and the first and second side walls 214 and 216 of the second pole tip layer. FIG. 19 illustrates still a further embodiment of the invention, wherein the ion milling cycle is employed to slightly notch the first pole piece layer 200 of the first pole piece with first and second side walls 236 and 238. Field regions 240 and 242 of the first pole piece layer 200 of the first pole piece in FIG. 19 slope slightly downwardly from the notches at 236 and 238 because of the longer milling cycle and shadowing by the second pole tip 210. The preferred embodiment is shown in FIG. 17. In all embodiments, milling continues until the first side walls are contiguous and the second side walls are contiguous of each of the second pole tip 210, the gap layer 222 and the notching layer 202. In the FIG. 19 embodiment, the first side walls 214, 224, 234 and 236 are contiguous and the second side walls 216, 226, 235 and 238 are contiguous.

In all three embodiments, the second pole tip is frame plated in FIG. 14 with sufficient thickness and width, so that, after the termination of the milling cycle, the track width of the second pole tip 210 in FIGS. 17, 18 and 19 is aligned with the target track width (TW). In all three embodiments, very small corners of the notching layer 202 have been removed by the milling, which requires significantly less time than milling the large expanse of the first pole piece layer 200 in order to achieve notching. After completion of the notching, an overcoat layer 240 is formed, as shown in FIG. 20. This is shown for the preferred embodiment, which was constructed in FIG. 17.

FIGS. 21–30 illustrate another embodiment of the invention which implements single side notching of the first pole piece. In FIG. 21, a notching layer 250 (PIN) is frame plated on the first pole piece layer 200 of the first pole piece. The first pole piece includes the first pole piece layer 200 and the notching layer 250. The notching layer 250 has a top 252 and a first side wall 254, which is the same as the side wall 206 shown in FIG. 10. The notching layer 250 differs from the previous embodiment in that the top 252 has a large expanse, which may coincide with the lateral expanse of the first pole piece layer 200 as it extends away from the first side wall 254. Accordingly, the notching layer 250 has only one corner at the side wall 254, milled in a subsequent step for notching purposes.

Figure 23:
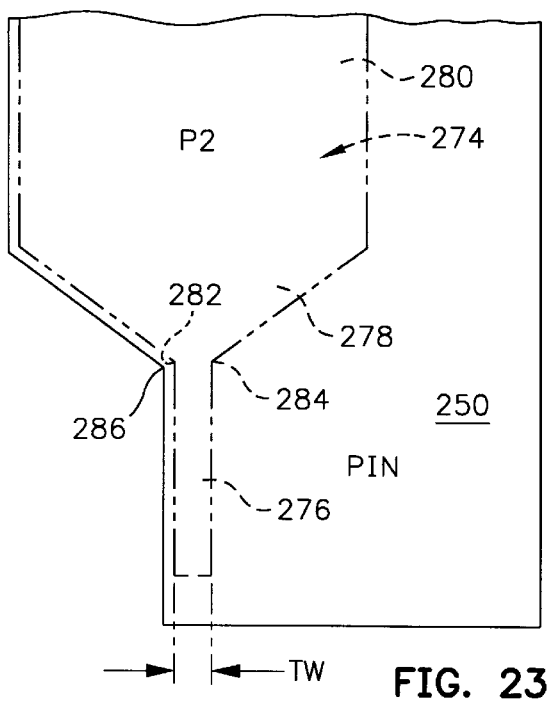
FIG. 23 is a view taken along plane XXIII—XXIII of FIG. 21 showing a second aspect of the second embodiment of the invention shown in FIG. 21 with the second pole piece shown in phantom.

Two embodiments of the planar shape of the notching layer 250 are shown in FIGS. 22 and 23. In FIG. 22, the second pole piece is shown in phantom at 260, with a pole tip region 262, a flare region 264 and a yoke region 266, the commencement of the flare region 264 being shown at flare points 268 and 270. In this embodiment the flare point 268, located on the side where the notching layer 250 is to be notched, is recessed farther into the head than the flare point 270. Accordingly, the notched layer 250 is provided with an inside corner 272 that is adjacent to the flare point 268, and that matches the flare 264 back to the yoke region 266. On the other side of the pole tip region 262, where the flare point 270 is located, notching will not be implemented, and the notching layer 250 provides a wide lateral expanse extending from the pole tip region 262. In this embodiment, the notching layer 250 is frame plated with a planar shape, as shown in FIG. 22.

Another embodiment of the notching layer 250 is shown in FIG. 23. In this embodiment, the second pole piece 274 has a pole tip region 276, a flare region 278 and a yoke region 280. The flare region 278 commences at flare points 282 and 284. In this embodiment, the notching layer 250 has an inside corner 286 that is adjacent the flare point 282 and that extends along just the outside of the flare region 278 and the yoke region 280. The notching layer 250 on the opposite side of the pole tip region 276 has a large lateral expanse, as does the notching layer in FIG. 22.

The difference between FIGS. 22 and 23 is that the flare in FIG. 22 is asymmetrical, while the flare in FIG. 23 is symmetrical. The embodiment shown in FIG. 22 has an advantage from a processing standpoint, in that the second pole piece 260 on the side of the notched layer to be notched is recessed further into the head, so as to minimize shadowing by the second pole piece when the notched layer is milled, which will be described in more detail hereinafter. This advantage has to be balanced with the magnetics of the head, as compared to the typical symmetrical flare region 286 shown in FIG. 23. At this point in the process, the second pole piece 266 in FIG. 22 and the second pole piece at 280 in FIG. 23 have not been formed.

Figure 24:
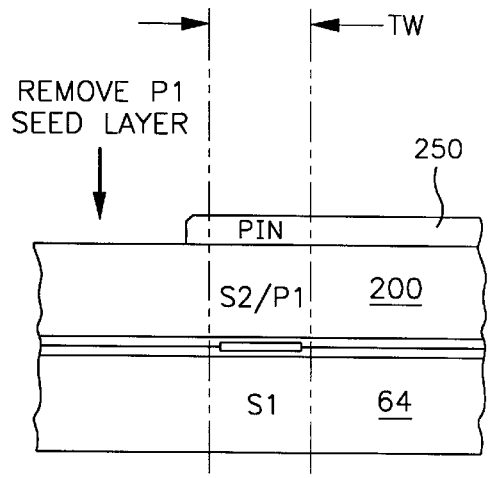
FIG. 24 is an ABS view of a second step in the second embodiment wherein a P1 seed layer is removed.
Figure 25:
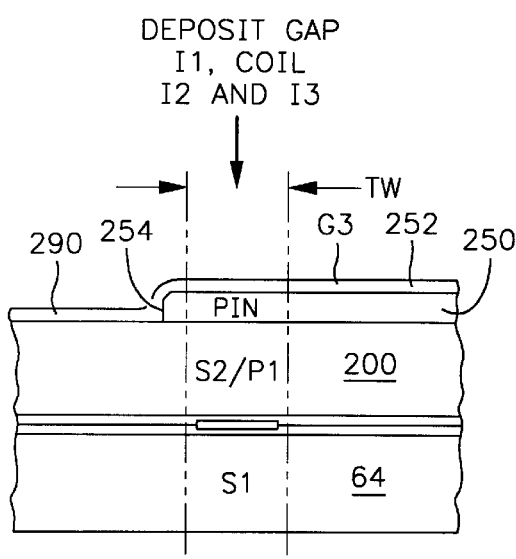
FIG. 25 is an ABS view showing the formation of a gap layer.

In FIG. 24, the first pole piece seed layer is removed, which causes a slight rounding of the upper corner of the notched layer 250. Next, a gap layer 290 is deposited along with a first insulation layer (not shown), a coil layer (not shown), a second insulation layer (not shown), and a third insulation layer (not shown). The first insulation layer, the coil layer, the second insulation layer, and the third insulation layer can be seen in FIG. 5 at 70, 68, 72 and 74 respectively. The gap layer 290 is a full film layer that covers the entire top 252 of the notching layer, the side 254 of the notching layer, and the remaining lateral expanse of the first pole piece layer.

Figure 26:
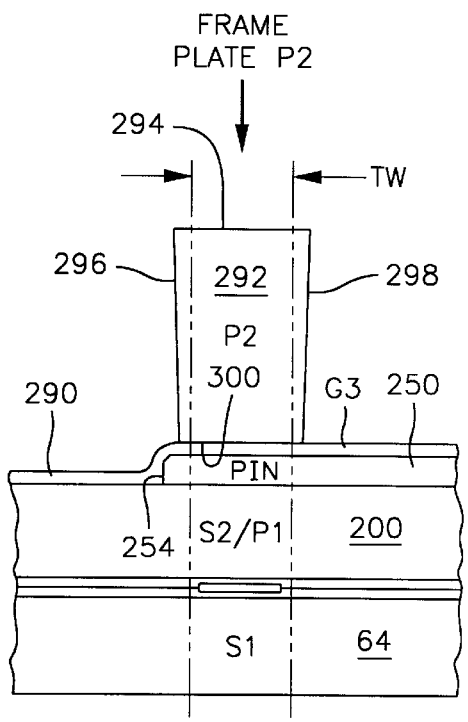
FIG. 26 is an ABS view showing frame plating the second pole tip on the gap layer.
Figure 27:
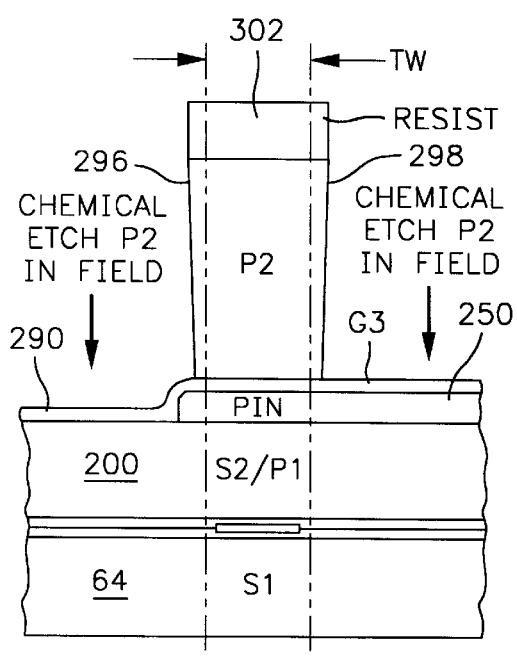
FIG. 27 is an ABS view showing chemically etching unwanted second pole piece material in the field.
Figure 28:
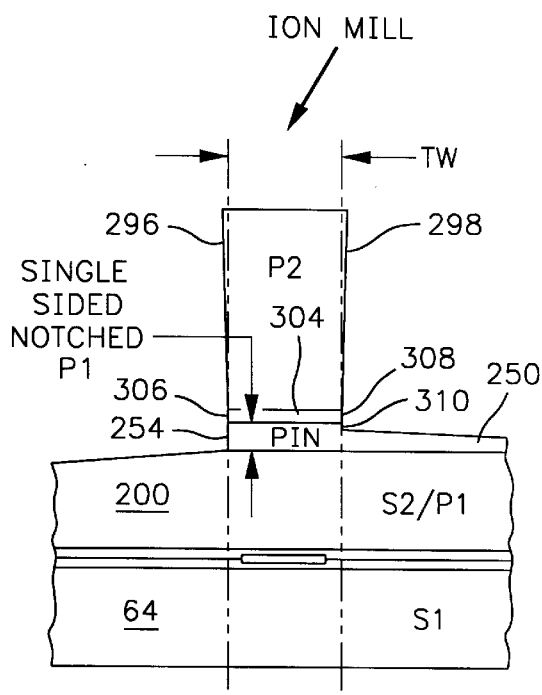
FIG. 28 is an ABS view of the second embodiment of the invention after notching the PIN by ion milling.
Figure 29:
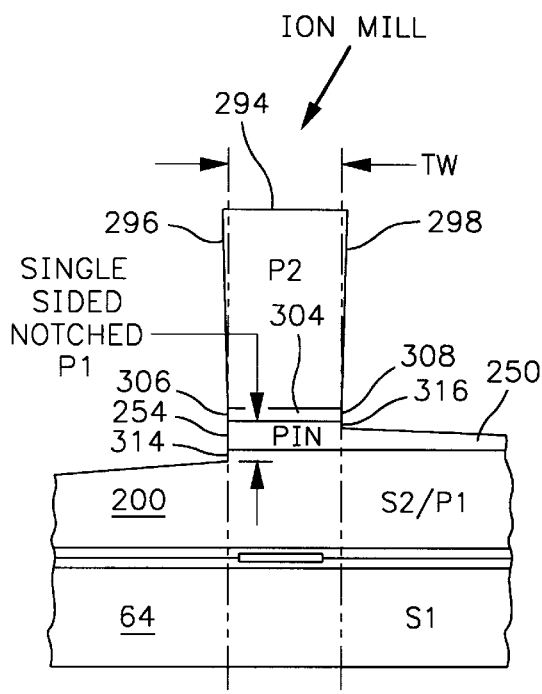
FIG. 29 is an alternative embodiment similar to FIG. 28 except the bottom layer of the first pole piece has also been slightly notched by ion milling.
Figure 30:
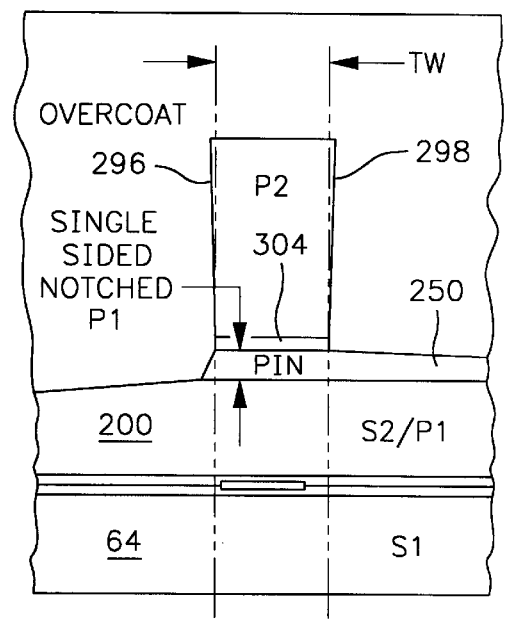
FIG. 30 is an ABS view of the embodiment shown in FIG. 28 after forming an overcoat.

The next step is to frame plate the second pole piece, along with a second pole tip 292, as shown in FIG. 26. The second pole tip 292 is bounded by a top 294, first and second side walls 296 and 298, and a base 300. As stated hereinabove, the thickness and width of the second pole tip 292 is enlarged to account for erosion by processing steps, including the subsequent milling step for notching the notching layer 250. In FIG. 27 a resist layer 302 is formed on top of the second pole tip, and second pole piece material located in the field is removed by chemical etching. In FIG. 28 ion milling is implemented at an angle to a normal to the planes of the layers 64 and 200, this angle being preferably 10° to 55°, as discussed hereinabove. This milling reduces the gap layer 290 in FIG. 27 to form a write gap layer 304 with first and second side walls 306 and 308. The milling continues until the first side walls 296, 306 and 254 are contiguous. This milling causes a very slight notching in the large lateral expanse of the notching layer 250, forming a very small side wall 310. For all practical purposes, the first pole piece has been provided with a single notch at 254. In FIG. 29, a longer milling cycle is employed to notch into the first pole piece layer 200 to form a first side wall 314. In this embodiment the milling cycle is employed until the first side walls 296, 306, 254 and 314 are contiguous. The notching layer on the other side of the pole tip would be slightly notched, as shown at 316. The preferred embodiment is shown in FIG. 28, since less milling time is required, which embodiment is shown formed with an overcoat in FIG. 30. It should be understood that the notching layer 250 could optionally be partially notched, as shown in FIG. 17, if desired.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a write head that has an air bearing surface (ABS) and a notched first pole piece at the ABS, the notched first pole piece conforming to a predetermined track width of a second pole tip layer, the method comprising:

forming a first pole piece layer perpendicular to the ABS;

forming a notching layer on the first pole piece layer with a lateral width at the ABS that is narrower than a lateral width of the first pole piece layer at the ABS, the notching layer having at least a first side wall laterally spaced a predetermined distance in a first direction laterally from said track width;

forming a gap layer on the notching layer;

forming a second pole tip layer on the gap layer with first and second side walls and a lateral width that is larger than said track width; and using the second pole tip layer as a mask, milling a portion of the gap layer and the first side wall of the notching layer not under the second pole tip until the gap layer has a first side wall and until the first side walls of the second pole tip layer, the gap layer and at least a portion of the first side wall of the notching layer are aligned with respect to one another.

2. The method as claimed in claim 1, further including:

forming the layers on a substrate;

the forming of the first pole piece layer, the notching layer, the gap layer and the second pole tip layer forming each of these layers with a top flat surface;

said milling being at an angle between 10° to 55° to a normal to the top flat surfaces of said layers; and rotating the substrate while milling.

3. The method as claimed in claim 1, further including:

said milling also milling the first pole piece layer with a first side wall which is contiguous with said first side wall of the notching layer.

4. The method as claimed in claim 1, wherein the notching layer is formed with a different magnetic moment material than a magnetic moment material of the first pole piece layer.

5. The method as claimed in claim 1, wherein said predetermined distance is in a range of 0.10 $\mu$m to 1.0 $\mu$m.

6. The method as claimed in claim 1, further including:

prior to forming the second pole tip layer, forming a seed layer on the gap layer, and then forming the second pole tip layer on the seed layer; and milling a portion of the seed layer not under the second pole tip layer; and employing a same milling cycle for first milling said portion of the seed layer and then milling said portion of the gap layer and the first side wall of the notching layer.

7. The method as claimed in claim 1, further including:

forming the notching layer with a second side wall laterally spaced said predetermined distance in a second direction laterally from said track width; and said milling also milling said portion of the gap layer and the second side wall of the notching layer not under the second pole tip until the gap layer has a second side wall and until the second side walls of the second pole tip layer, the gap layer and at least a portion of the second side wall of the notching layer are contiguous.

8. The method of claim 7, wherein the combined magnetic head further includes a read head, wherein making the read head comprises:

before forming the first pole piece layer of the first pole piece, forming a first shield layer;

forming a first gap layer on the first shield layer;

forming a magnetoresistive (MR) sensor with first and second lead layers on the first gap layer, the MR sensor being centered with respect to said track width at the ABS;

forming a second gap layer on the MR sensor, the first and second lead layers and the first gap layer; and said forming of the first pole piece layer forming the first pole piece layer on the second gap layer.

9. The method as claimed in claim 7, wherein said predetermined distance is formed in a range of 0.1 $\mu$m to 1.0 $\mu$m.

10. The method as claimed in claim 9, wherein the notching layer is formed with a thickness of 0.1 $\mu$m to 1.0 $\mu$m.

11. The method as claimed in claim 10, wherein the track width is formed 1 $\mu$m or less.

12. The method as claimed in claim 11, further including:

prior to forming the second pole tip layer, forming a seed layer on the gap layer, and then forming the second pole tip layer on the seed layer;

milling a portion of the seed layer not under the second pole tip layer; and employing a same milling cycle for first milling said portion of the seed layer and then milling said portion of the gap layer and the first side wall of the notching layer.

13. The method as claimed in claim 12, further including:

forming the layers on a substrate;

the forming of the first pole piece layer, the notching layer, the gap layer and the second pole tip layer forming each of these layers with a top flat surface;

said milling being at an angle between 10° to 55° to a normal to the top flat surfaces of said layers; and rotating the substrate while milling.

14. The method as claimed in claim 13, further including:

said milling also milling the first pole piece layer with first and second side walls that are contiguous with the first and second side walls, respectively, of the notching layer.

15. The method as claimed in claim 13, wherein the notching layer is formed with a different magnetic moment material than a magnetic moment material of the first pole piece layer.

16. The method as claimed in claim 15, further including:

forming the first pole piece layer of substantially $Ni_{80}Fe_{20}$ material, and forming the notching layer of substantially $Ni_{45}Fe_{55}$ material.

17. The method as claimed in claim 15, further including:

forming the first pole piece layer of substantially $Ni_{45}Fe_{55}$ material and forming the notching layer of substantially $Ni_{80}Fe_{20}$ material.

18. The method as claimed in claim 13, further including:

before forming the second pole tip layer:

forming a first insulation layer on the notching layer;

forming a coil layer on the first insulation layer; and forming at least a second insulation layer on the coil layer; and said forming of the second pole tip layer also forming the second pole piece layer on the second insulation layer.

19. A method of making a write head that has an air bearing surface (ABS) and a notched first pole piece at the ABS, the notched first pole piece conforming to a predetermined track width of a second pole tip layer, the method comprising:

forming a first pole piece layer perpendicular to the ABS;

forming a notching layer on the first pole piece layer with a lateral width at the ABS that is narrower than a lateral width of the first pole piece layer at the ABS, the notching layer having at least a first side wall laterally spaced a predetermined distance in a first direction laterally from said track width;

forming a gap layer on the notching layer;

forming a second pole tip layer on the gap layer with first and second side walls and a lateral width that is larger than said track width;

using the second pole tip layer as a mask, milling a portion of the gap layer and the first side wall of the notching layer not under the second pole tip until the gap layer has a first side wall and until the first side walls of the second pole tip layer, the gap layer and at least a portion of the first side wall of the notching layer are contiguous;

the forming of the notching layer forming the notching layer with a flare portion, the flare portion having first and second sides that extend in said first and second directions away from the second pole tip layer, the first and second sides of the flare being recessed from the ABS and the recession of the first side being more than the recession of the second side;

the forming of the second pole tip layer also forming a second pole piece layer, the second pole piece layer having a flare portion, the flare portion having first and second sides that extend in said first and second directions away from the second pole tip layer, the first and second sides of the flare being recessed from the ABS and the recession of the first side being more than the recession of the second side; and the notching layer having a second side wall located a distance greater than said predetermined distance from the track width in said second direction.

20. The method of claim 19, wherein the combined magnetic head further includes a read head, wherein making of the read head comprises:

before forming the first pole piece layer of the first pole piece, forming a first shield layer;

forming a first gap layer on the first shield layer;

forming a magnetoresistive (MR) sensor with first and second lead layers on the first gap layer, the MR sensor being centered with respect to said track width at the ABS; and forming a second gap layer on the MR sensor, the first and second lead layers and the first gap layer; and said forming of the first pole piece layer forming the first pole piece layer on the second gap layer.

21. The method as claimed in claim 19, wherein said predetermined distance is in a range of 0.1 $\mu$m to 1.0 $\mu$m.

22. The method as claimed in claim 21, wherein the notching layer is formed with a thickness of 0.1 $\mu$m to 1.0 $\mu$m.

23. The method as claimed in claim 22, wherein the track width is formed 1 $\mu$m or less.

24. The method as claimed in claim 23, further including:

prior to forming the second pole tip layer, forming a seed layer on the gap layer, and then forming the second pole tip layer on the seed layer; and milling a portion of the seed layer not under the second pole tip layer; and employing a same milling cycle for first milling said portion of the seed layer and then milling said portion of the gap layer and the first side wall of the notching layer.

25. The method as claimed in claim 24, further including:

forming the layers on a substrate;

the forming of the first pole piece layer, the notching layer, the gap layer and the second pole tip layer forming each of these layers with a top flat surface;

said milling being at an angle between 10° to 55° to a normal to the top flat surfaces of said layers; and rotating the substrate while milling.

26. The method as claimed in claim 24, further including:

said milling also milling the first pole piece layer with a first side wall which is contiguous with said first side wall of the notching layer.

27. The method as claimed in claim 24, wherein the notching layer is formed with a different magnetic moment material than a magnetic moment material of the first pole piece layer.

28. The method as claimed in claim 27, further including:

forming the first pole piece layer of substantially $Ni_{80}Fe_{20}$ material, and forming the notching layer of substantially $Ni_{45}Fe_{55}$ material.

29. The method as claimed in claim 27, further including:

forming the first pole piece layer of substantially $Ni_{45}Fe_{55}$ material, and forming the notching layer of substantially $Ni_{80}Fe_{20}$ material.

30. The method as claimed in claim 24, further including:

before forming the second pole tip layer:

forming a first insulation layer on the notching layer;

forming a coil layer on the first insulation layer; and forming at least a second insulation layer on the coil layer; and said forming of the second pole tip layer also forming the second pole piece layer on the second insulation layer.

31. A method of making a partially completed write head that has an air bearing surface (ABS) site and a second pole tip layer that has a track width at the ABS site comprising:

forming a first pole piece layer with a track width site that is in alignment with a second pole tip layer track width site that corresponds to said track width of the second pole tip layer and with top and bottom surfaces and first and second side edges that are outboard of the track width site of the first pole piece layer;

forming a notching layer on the top surface of the first pole piece layer with a track width site that is in alignment with said second pole tip layer track width site and with top and bottom surfaces and first and second side edges that are inboard of the first and second side edges of the first pole piece layer but outboard of the track width site of the notching layer;

forming a write gap layer on the notching layer and the first pole piece layer that has a track width site in alignment with the second pole tip layer track width site;

forming a partially formed second pole tip layer on the write gap layer with a track width site in alignment with the second pole tip layer track width site and with top and bottom surfaces and first and second side edges that are inboard of the first and second side edges of the notching layer but outboard of the track width site of the partially formed second pole tip layer;

while employing the partially formed second pole tip layer as a mask, ion milling the partially formed second pole tip layer, portions of the write gap layer and portions of the notching layer until the partially completed second pole tip layer is formed into said second pole tip layer with first and second side edges that coincide with and define said track width.

32. A method as claimed in claim 31 including:

each of the first pole piece layer and the notching layer being formed with a ferromagnetic material with a magnetic moment; and the magnetic moment of the notching layer being greater than the magnetic moment of the first pole piece layer.

33. A method as claimed in claim 32 wherein the first pole piece layer is formed of substantially $Ni_{80}Fe_{20}$ and the notching layer is formed of substantially $Ni_{45}Fe_{55}$.

34. A method as claimed in claim 31 wherein, before ion milling, each of the side edges of the notching layer extends 0.10 $\mu$m to 1.0 $\mu$m beyond the track width site of the notching layer.

35. A method as claimed in claim 31 including:

the forming of the notching layer forming the first and second side edges and the top surface of the notching layer with first and second corners respectively; and said ion milling milling away said first and second corners.

36. A method as claimed in claim 31 wherein, during ion milling, the write gap layer is milled with first and second side edges that are contiguous with the first and second side edges respectively of the second pole tip layer and the notching layer is milled with first and second side edges that are contiguous with the milled first and second side edges respectively of the write gap layer.

37. A method as claimed in claim 36 wherein, before ion milling, each of the side edges of the notching layer extends 0.10 μm to 1.0 μm beyond the track width site of the notching layer.

38. A method as claimed in claim 37 including:
the forming of the notching layer forming the first and second side edges and the top surface of the notching layer with first and second corners respectively; and
said ion milling milling away said first and second corners.

39. A method as claimed in claim 38 including:
each of the first pole piece layer and the notching layer being formed with a ferromagnetic material with a magnetic moment; and
the magnetic moment of the notching layer being greater than the magnetic moment of the first pole piece layer.

40. A method as claimed in claim 39 wherein the first pole piece layer is formed of substantially $Ni_{80}Fe_{20}$ and the notching layer is formed of substantially $Ni_{45}Fe_{55}$.

41. A method of making a merged magnetic head that has an air bearing surface (ABS) and a read head and a write head wherein the write head has a second pole tip layer that has a track width at said ABS comprising:
forming a first shield layer with an ABS site that corresponds to said ABS;
forming a first read gap layer on the first shield layer with an ABS site that corresponds to said ABS;
forming a read sensor layer on the first read gap layer with an ABS site that corresponds to said ABS;
forming a second read gap layer on the read sensor layer with an ABS site that corresponds to said ABS;
forming a second shield/first pole piece layer with an ABS site that corresponds to said ABS, a track width site that is in alignment with a second pole tip layer track width site which corresponds to said track width of the second pole tip layer and with top and bottom surfaces and first and second side edges that are outboard of the track width site of the second shield/first pole piece layer;
forming a notching layer on the second shield/first pole piece layer with an ABS site that corresponds to said ABS, a track width site in alignment with said second pole tip layer track width site and with top and bottom surfaces and first and second side edges that are inboard of the first and second side edges of the second shield/first pole piece layer but outboard of the track width site of the notching layer;
forming a write gap layer on the notching layer and the second shield/first pole piece layer that has an ABS site that corresponds to said ABS and that has a track width site that aligns with said second pole tip layer track width site;
forming a second pole tip layer on the gap layer with an ABS site that corresponds to said ABS, a track width site that aligns with said second pole tip track width site and with top and bottom surfaces and first and second side edges that are inboard of the first and second side edges of the notching layer but outboard of the track width site of the second pole tip layer;
ion milling the second pole tip layer, portions of the write gap layer and portions of the notching layer until the second pole tip layer has milled first and second side edges that coincide with and define said track width;
forming an overcoat layer on the second shield/first pole piece layer and the second pole tip layer; and
forming the first shield layer, the first read gap layer, the read sensor, the second read gap layer, the second shield/first pole piece layer, the notching layer, the write gap layer, the second pole tip layer and the overcoat layer with said ABS.

42. A method as claimed in claim 41 including:
each of the first pole piece layer and the notching layer being formed with a ferromagnetic material with a magnetic moment; and
the magnetic moment of the notching layer being greater than the magnetic moment of the first pole piece layer.

43. A method as claimed in claim 42 wherein the first pole piece layer is formed of substantially $Ni_{80}Fe_{20}$ and the notching layer is formed of substantially $Ni_{45}Fe_{55}$.

44. A method as claimed in claim 41 wherein, before ion milling, each of the side edges of the notching layer extends 0.10 μm to 1.0 μm beyond the track width site of the notching layer.

45. A method as claimed in claim 41 including:
the forming of the notching layer forming the first and second side edges and the top surface of the notching layer with first and second corners respectively; and
said ion milling milling away said first and second corners.

46. A method as claimed in claim 41 wherein, during ion milling, the write gap layer is milled with first and second side edges that are contiguous with the first and second side edges respectively of the second pole tip layer and the notching layer is milled with first and second side edges that are contiguous with the milled first and second side edges respectively of the write gap layer.

47. A method as claimed in claim 46 wherein, before ion milling, each of the side edges of the notching layer extends 0.10 μm to 1.0 μm beyond the track width site of the notching layer.

48. A method as claimed in claim 47 including:
the forming of the notching layer forming the first and second side edges and the top surface of the notching layer with first and second corners respectively; and
said ion milling milling away said first and second corners.

49. A method as claimed in claim 48 including:
each of the first pole piece layer and the notching layer being formed with a ferromagnetic material with a magnetic moment; and
the magnetic moment of the notching layer being greater than the magnetic moment of the first pole piece layer.

50. A method as claimed in claim 49 wherein the first pole piece layer is formed of substantially $Ni_{80}Fe_{20}$ and the notching layer is formed of substantially $Ni_{45}Fe_{55}$.

* * * * *